Dec. 12, 1939. F. BUCHHORN 2,183,007
DEVICE ADAPTED FOR CLEANSING PIPES
Filed Aug. 4, 1938
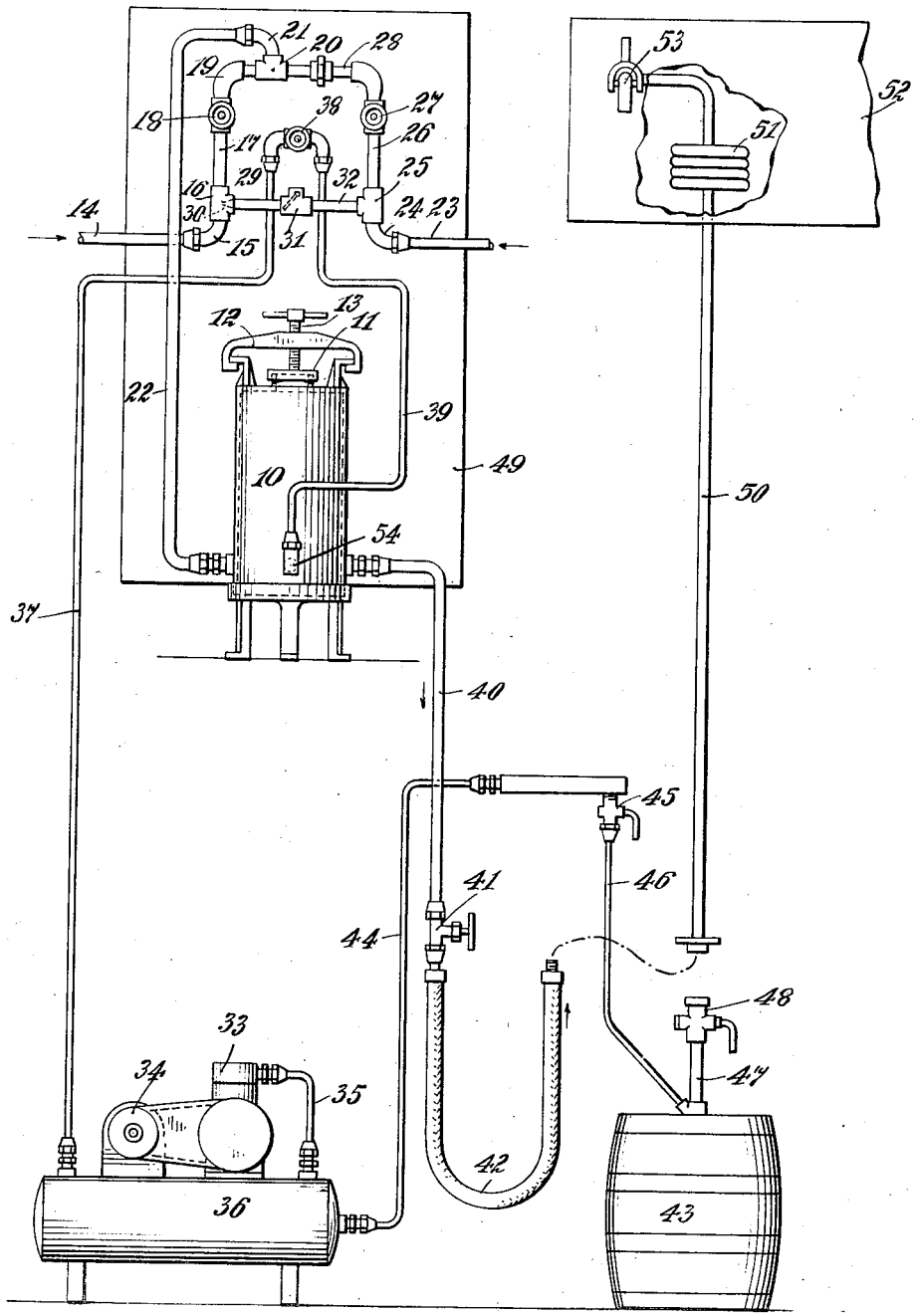
Fred Buchhorn
INVENTOR.
BY
ATTORNEY.

Patented Dec. 12, 1939

2,183,007

UNITED STATES PATENT OFFICE 2,183,007

DEVICE ADAPTED FOR CLEANSING PIPES

Fred Buchhorn, New York, N. Y.

Application August 4, 1938, Serial No. 223,006

4 Claims. (Cl. 225—12)

My invention relates to pipe cleansing processes and refers particularly to processes adapted for the cleansing of beer pipe systems.

Satisfactory processes for the cleansing of pipes, and especially those employed with alimentary liquids, such as beer, in which deposits may have a deleterious effect upon the liquids, must have certain definite properties, among which may be mentioned, they must allow of the retention of a cleansing solution in the pipes for a desired period of time, they must be adapted to force cleansing liquids, hot water and cold water through the system, they must allow of the passage of air through the system in order to dry it, they must be highly efficient in the various steps of procedure, they must be simple in construction and easily operated, and in those cases where a liquid easily delivered under pressure is desired, they should be so constructed as to be easily applied to provide pressure within the liquid container for such purposes and should also be adapted to force out the remaining liquid from within the system prior to the cleansing operations.

All of the above mentioned, and other, valuable and desirable attributes will be found in the employment of the device of my invention, as will be evidenced upon a consideration of my specification and its accompanying drawing.

The accompanying drawing in which similar numerals represent similar parts exemplifies one form of a device of my invention.

The particular form of the device of my invention shown in the accompanying drawing comprises a liquid container 10, closed at the bottom and having an opening in the top capable of being closed by the cover 11 which can be maintained in place by the yoke 12 and the threaded revoluble rod 13.

A hot water supply pipe 14 connected to a source of hot water, not shown, is connected to a pipe series comprising the pipe 15, the T-coupling 16, the pipe 17, the valve 18, the pipe 19, the T-coupling 20, the pipe 21 and the pipe 22, the latter entering the lower portion of the liquid container 10.

A cold water supply pipe 23 connected to a source of cold water, not shown, is connected to a pipe series comprising the pipe 24, the T-coupling 25, the pipe 26, the valve 27, and the pipe 28, the latter being connected to the T-coupling 20.

A pipe 29, having an injector end 30, is connected to a check valve 31 which is connected to a pipe 32, which latter is connected to the T-coupling 25.

An air pressure pump 33 driven by the motor 34 has a pipe 35 connecting it with the air pressure tank 36.

The air pressure tank 36 is connected to the lower portion of the liquid tank 10 by means of a series of pipes comprising the pipe 37, the valve 38 and the pipe 39, having the check valve 54 to prevent water from passing through the air system.

Connected with the lower portion of the liquid tank 10 is a pipe 40 carrying the valve 41, the latter being connected to a hose 42.

The air pressure tank 36 is connected to the interior of the beer keg 43 by means of the pipe 44, the valve 45 and the pipe 46. The keg 43 has a pipe 47 extending to the lower portion thereof and carrying the valve 48.

For convenience, a number of these elements may be attached to the panel 49, as indicated.

A pipe 50, continued into the coil 51 within the refrigerating tank 52, is extended into the faucet 53.

The operation of my device in cleansing the pipe 50 and the coil 51 is as follows:

The hose 42 is attached to the lower end of the pipe 50. All valves are closed with the exception of valve 41. A solution of a cleansing reagent, such as soda, is introduced into the liquid container 10 and the cover 11 hermetically sealed thereon. The faucet 53 and valve 38 are opened and the air pressure pump 33 started. The air is thus forced through the pipe system into the container 10 and thence outwardly through the pipe 40, the hose 42, the pipe 50 and the faucet 53.

As soon as the liquid commences to pass through the faucet 53, the faucet 53 and the valve 38 are closed, automatically stopping the pump 33.

The cleansing solution is then allowed to rest in the system, to cleanse it and to loosen any undesirable matters from the inner surfaces of the system.

Valve 38 and faucet 53 are then opened, the pump starting automatically and forcing the cleansing solution out of the system.

In order to wash the cleansing solution out of the system, valve 38 is closed and valve 18 is opened. Hot water thus passes through the pipe 14 and cold water passes through the pipes 23, 32 and 29, and the check valve 31, the two waters being intermingled at the T-coupling 16, in order to obtain the desired temperature.

As the hot water pressure is greater than the cold water pressure, it cannot pass through the check valve 31.

Then valve 18 is closed and valve 38 opened, thus blowing all of the hot water out of the system.

Then valve 38 is closed and valve 27 is opened, thus forcing cold water through the system. Valve 27 is closed and valve 38 is opened, thus forcing air through the system thus forcing all of the cold water out of the system and drying the system thoroughly.

When the system has been thoroughly cleaned and dried, the hose 42 is disconnected from the pipe 50, the valves 38, 18 and 27 and the faucet 52 are closed, the valve 45 is opened, and the pipe 47 is connected to the pipe 50, thus allowing the pressure pump to force air under pressure into the keg 43 for the dispensation of its contents through the faucet 53 as desired.

It will thus be seen that my invention presents a simple and easily operated device for the cleansing of liquid pipe systems, including flushing them with a cleansing solution, hot water and cold water, and finally drying them for purposes of reuse.

I do not limit myself to the particular size, number or arrangement of parts as shown and described as those are given simply as a means for clearly describing my invention.

What I claim is:

1. In a device adapted for cleansing pipes, in combination, an air-pressure tank, a liquid container, an air pipe connecting said air-pressure tank with said liquid container and having a valve therein, a hot water pipe adapted to supply hot water and having a valve therein, a cold water pipe adapted to supply cold water and having a valve therein, a connecting pipe between said hot water pipe and said cold water pipe and having a T connection therein, a pipe connecting said T connection with said liquid container, a by-pass pipe connecting said hot water pipe and said cold water pipe, said by-pass pipe having an injector end within said hot water pipe and an exit pipe connected with said liquid container and having a valve therein.

2. In a device adapted for cleansing pipes, in combination, an air-pressure tank, a liquid container, an air pipe connecting said air-pressure tank with said liquid container and having a valve therein, a hot water pipe adapted to supply hot water and having a valve therein, a cold water pipe adapted to supply cold water and having a valve therein, a connecting pipe between said hot water pipe and said cold water pipe and having a T connection therein, a pipe connecting said T connection with said liquid container, a by-pass pipe connecting said hot water pipe and said cold water pipe, said by-pass pipe having an injector end within said hot water pipe, an exit pipe connected with said liquid container and having a valve therein, and a flexible hose carried by the free end of said exit pipe.

3. In a device adapted for cleansing pipes, in combination, an air-pressure tank, a liquid container, an air pipe connecting said air-pressure tank with said liquid container and having a valve therein, a hot water pipe adapted to supply hot water and having a valve therein, a cold water pipe adapted to supply cold water and having a valve therein, a connecting pipe between said hot water pipe and said cold water pipe and having a T connection therein, a pipe connecting said T connection with said liquid container, a by-pass pipe connecting said hot water pipe and said cold water pipe, said by-pass pipe having an injector end within said hot water pipe, an exit pipe connected with said liquid container and having a valve therein, and a second air pipe adapted to be extended from said air-pressure tank to the interior of a beer receptacle.

4. In a device adapted for cleansing pipes, in combination, an air-pressure tank, a liquid container, an air pipe connecting said air-pressure tank with said liquid container and having a valve therein, a hot water pipe adapted to supply hot water and having a valve therein, a cold water pipe adapted to supply cold water and having a valve therein, a connecting pipe between said hot water pipe and said cold water pipe and having a T connection therein, a pipe connecting said T connection with said liquid container, a by-pass pipe connecting said hot water pipe and said cold water pipe, said by-pass pipe having an injector end within said hot water pipe, an exit pipe connected with said liquid container and having a valve therein, a stand-pipe adapted to be attached to a pipe extending from a beer receptacle and having a faucet at its upper end and means adapted to attach the free end of said exit pipe to the lower end of said stand-pipe.

FRED BUCHHORN.